United States Patent [19]

Lewakowski et al.

[11] 4,291,563

[45] Sep. 29, 1981

[54] METHOD OF MAKING L-SEAL FOR GAS TURBINE REGENERATOR

[75] Inventors: John J. Lewakowski; Theodore M. Ciagala, both of Warren, Mich.

[73] Assignee: Chrysler Corporation, Highland Park, Mich.

[21] Appl. No.: 954,509

[22] Filed: Oct. 25, 1978

[51] Int. Cl.³ .............................................. B21D 11/10
[52] U.S. Cl. ................................... 72/216; 113/116 H
[58] Field of Search ............ 113/116 D, 116 H, 116 B; 165/9; 277/81 R, 88, 89, 165, 212 F; 29/156.6; 267/161, 162; 72/215, 216, 125

[56] References Cited

U.S. PATENT DOCUMENTS

| | | | |
|---|---|---|---|
| 1,032,718 | 7/1912 | White | 72/366 |
| 1,303,896 | 5/1919 | Hecht et al. | 29/156.6 |
| 2,534,124 | 12/1950 | Hasselhorn | 113/116 B |
| 2,743,948 | 5/1956 | Heinrich | 267/162 |
| 3,157,226 | 11/1964 | Atwood | 165/9 |
| 3,805,882 | 4/1974 | Vallance | 277/88 |
| 4,117,704 | 10/1978 | Nakache et al. | 72/84 |

Primary Examiner—Lowell A. Larson
Attorney, Agent, or Firm—Newtson & Dundas

[57] ABSTRACT

An improved L-shaped seal for a turbine regenerator and a method of making same. The seal has a curved leg which contacts a mating surface. The curve urges the seals leg into contact about the periphery of the seal even when there is no gas pressure in the regenerator.

2 Claims, 2 Drawing Figures

METHOD OF MAKING L-SEAL FOR GAS TURBINE REGENERATOR

BACKGROUND OF THE INVENTION

1. Field of the Invention

In one aspect this invention relates to L-shaped seals suitable for sealing. In a further aspect this invention relates to a method of forming such L-shaped seals.

2. Prior Art

U.S. Pat. No. 3,957,106 issued to James Whitfield discloses the use of an L-seal with a rotary regenerator assembly. The regenerator assembly has non-rotatable rubbing seals in contact with each side of the regenerator. An L-shaped seal is located so as to seal the gap between the rubbing seal and the housing containing the regenerator. A positive air pressure applied to the L-shaped seal during engine operation keeps the L-seal pressed firmly against the rubbing seal and the housing.

This seal represents an advance in the art of sealing means for use with rotary regenerators.

SUMMARY OF THE INVENTION

Briefly, this invention provides a method of forming an L-shaped seal. The process begins by severing a length of flat strip to be formed into an L-shaped seal of the desired configuration. The severed length of flat-strip is positioned so that a longitudinal portion of the strip is rigidly grasped to provide a firm anchor. A second longitudinal portion of the severed strip is unconstrained. After the strip is grasped, the free standing portion is incrementally formed towards a position where the formed second longitudinal portion makes an oblique angle with the clamped first portion. The oblique angle is defined by the line connecting the point of intersection of the two strip portions and the free ends of the strip portion.

After formation, the strip is released from the die and further processing can be performed on the strip to insure the finished seal has the desired properties. Generally, when the seal is formed from metal it will be heat treated after forming to develop the desired properties.

As an additional feature of the invention, the strip can be formed with a concave face on the formed portion. The concave curve of the deformed portion acts to bias the periphery of the L-seal into contact with the rubbing seal, the resulting seal having essentially a line contact at the outer periphery of the L-seal. Thus, the seal components are in sealing contact with the rotating regenerator while the engine is being started and before air pressure within the regenerator cavity is built up to normal operating pressure.

BRIEF DESCRIPTION OF THE DRAWINGS

In the accompanying drawings.

DESCRIPTION OF THE PREFERRED EMBODIMENT

Figure 1:
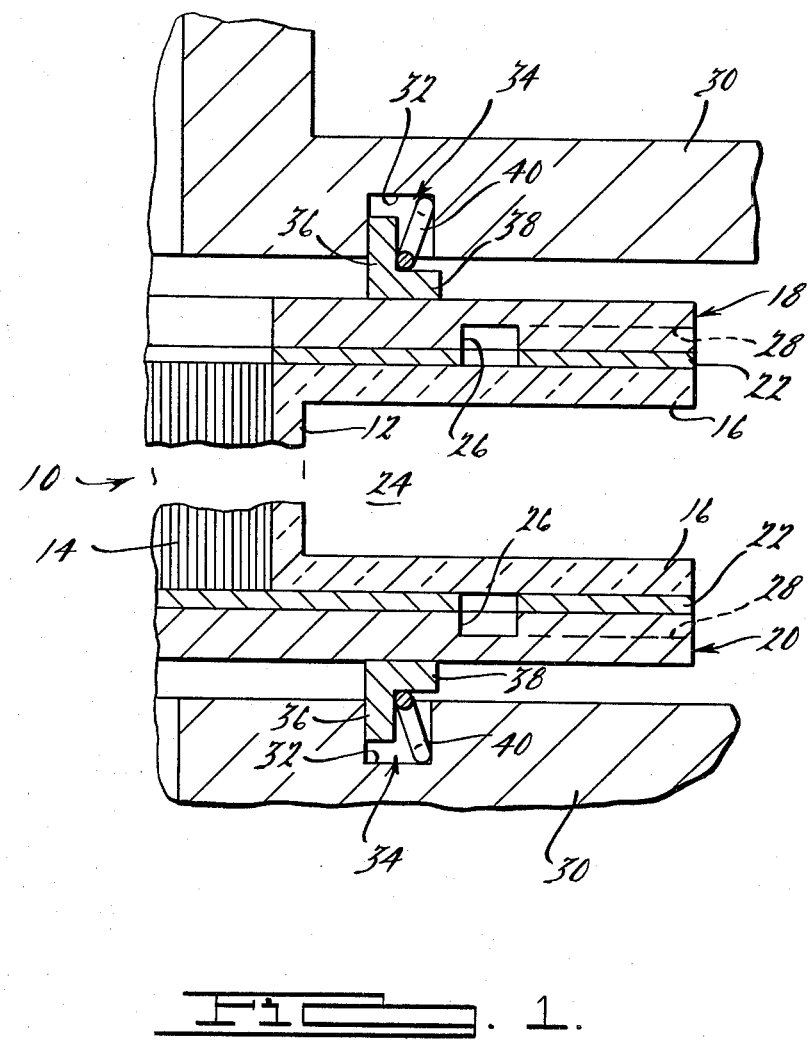
FIG. 1 is a fragmentary sectional view showing an L-seal of this invention in a regenerator cavity.

In FIG. 1 a typical portion of a rotating regenerator 10 has a rim 12 which extends radially outward from the core 14 of the regenerator. A pair of flanges 16 are in sealing contact with rubbing seals 18, 20 which are flexibly attached to a housing (not shown) containing the regenerator. As shown, the rubbing seals 18, 20 have a sealing layer 22 disposed between the seal and the associated flange 16, the sealing layer being a wear resistant material.

High pressure air coming into the regenerator is allowed to pass into the space 24 between the flanges 16 and moves into circumferential passages 26 located within the rubbing seals 18, 20 the air entering by means of radial passages 28 in the seals.

The flanges 16 extend radially outward between a pair of platforms 30 formed as part of the housing of the regenerator. The platforms each have a circumferential groove 32 located in the housing. The groove contains an L-seal 34 of this invention. As shown, the seal 34 has a first axial leg 36 seated in the groove 32 and a second radial leg 38 contacting the face of the associated rubbing seal.

High pressure air passing around the periphery of the regenerator forces the axial leg of the seal against the wall of the groove 32 and the radial leg against the associated rubbing seal. The L-shaped seal is normally held in place by mechanical means, such as a spring 40 which biases the seal 34 into engagement with the rubbing seal and groove in the absence of air pressure.

Figure 2:
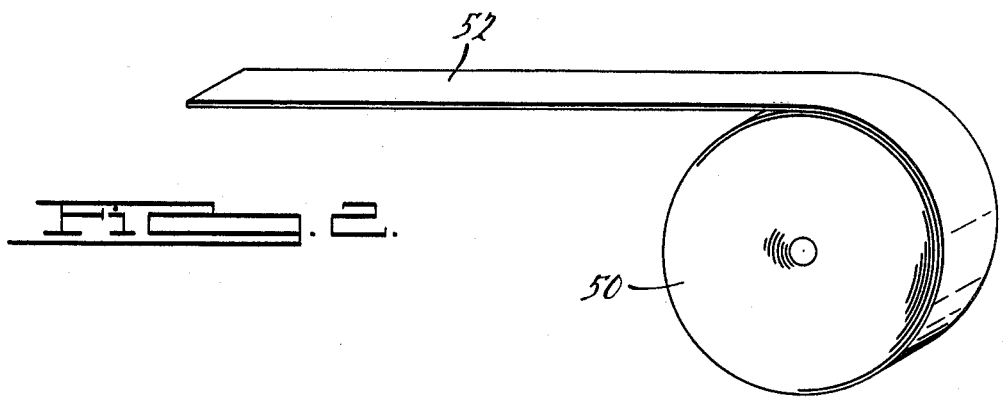
FIG. 2 shows a strip of flat material suitable for being formed into L-shaped seals.
Figure 3:
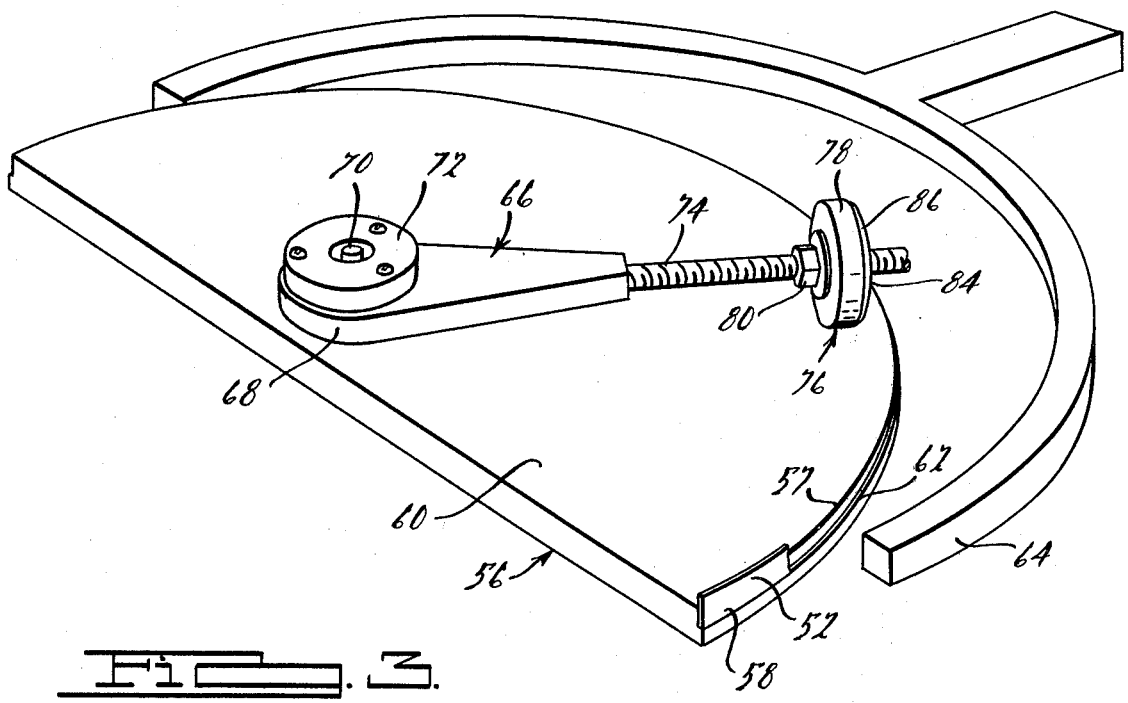
FIG. 3 shows a clamping and forming device suitable for use in the method of this invention.

FIG. 2 shows a coil 50 of metallic material suitable for being formed into the L-shaped seal using the method of this invention. Suitable materials comprise the metals, such as stainless steel and other corrosion resistant iron, nickel or cobalt based alloys. The material chosen must retain springiness and shape, withstand the pressures, temperatures, and environment involved in turbine regenerators which means the material should retain its flexibility and shape at temperatures exceeding those of the turbine exhaust gas.

A strip 52 of the flat material is severed and the resulting strip of material is placed about the periphery of a semicircular solid die 56, having a peripheral surface 57, as shown in FIG. 2. The strip 52 is disposed so an axial portion 58, which will become the axial portion of the seal, is below the upper surface 60 of the die 56 and rests on a ledge 62 of the die. Only a portion of the strip 52 is shown; however, the strip will extend all the way around the periphery of the die, with that portion of the strip which will not be formed resting on the ledge. A mating clamping member 64 is moved into contact with the die member 56 to hold the first longitudinal portion of the flat strip resting on the ledge firmly against the die member. With the clamping member in place, the flat strip is essentially held in a groove with the portion of the strip which is not to be formed held rigidly. A portion of the strip 52 which will become the radial leg of the seal stands upward perpendicular to the ledge on which the strip rests and extends essentially axially with respect to the semicircular die member.

A forming member designated generally 66 is mounted on the die member 56. The forming member 66 has a first end 68 journalled on a stud 70 and held in place by a collar 72. A threaded stud 74 extends radially outward from the first end; and a forming tool 76 is located on the second free end of the forming member 66 distal the journalled end. The forming tool 76 has a wheel 78 journalled coaxially with the threaded stud 74, the wheel being maintained at a fixed distance from the axis of stud 70 by a jam nut 80. In operation the reaction force of the strip being formed against the wheel 78 will cause the wheel to ride against the jam nut 80 during the formation process.

The tool 78 has a forming face 84 with a radiused working edge 86. When forming tool 66 is rotated about stud 70 radiused working edge 86 forms the strip 52 towards the surface of clamp 64. The wheel is moved radially outward after each pass of the forming tool until the desired amount of cold forming has taken place. The tool 78 can be moved by changing the location of the jam nut or the threaded stud can be rotated in a direction which moves the tool further from stud 70.

Figures 4A, 4B, 4C, 4D:
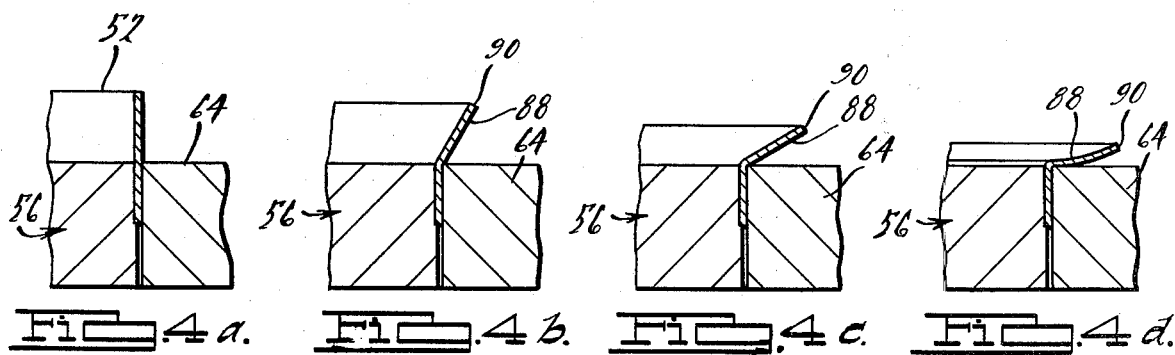
FIGS. 4a-4d (inclusive) show various stages of bending to form the L-seal.

Referring to FIGS. 4a, 4b, 4c and 4d, these figures show the clamped strip at various stages of deformation. In FIG. 4a, a strip is shown rigidly held between the clamping member 64 and the die member 56 with the first longitudinal portion held firmly between the clamping member and a second longitudinal portion of the strip extending vertically upward away from the die member. In FIG. 4b the forming tool has been moved to a position where the radiused working edge 76 contacts the second longitudinal portion of the strip and the tool has been rotated about the pivot from one end of the strip to the other. The strip has been slightly formed and now makes a large oblique angle with the unformed strip portion.

In FIG. 4c the wheel has been moved further from the center axis of the pivot point and a second pass taken using the forming member. This causes a further formation of the second longitudinal portion, resulting in a smaller oblique angle between the unformed portion.

FIG. 4c illustrates a third pass with the forming tool moved further from the center of rotation. The result is an L-shaped seal, which has a high residual tensile stress near its outer periphery and a relatively unstressed portion held between the clamping member and the die. Also, as shown, the seal has a slight concave shape on the formed portion 88. When installed in a regenerator apparatus, the peripheral edge 90 of the formed circumferential leg will be biased into contact with the surface being sealed, thereby forming a tight seal during starting of the regenerator. Once the regenerator has been started, a positive pressure is applied to the seal as described before.

After the seal has been formed, the clamping member 64 is moved away from the die member 56 and the finished seal taken out of the die member. The die is now ready to receive another flat strip for forming.

The seal can be heat treated to develop the desired properties.

It is apparent from the drawings and the descriptions that an improved L-shaped seal has been formed.

The two legs form an oblique angle therebetween. When one leg is curved as shown in the FIGS. 4a, 4b, 4c and 4d, a line from the point of the leg's intersection to the periphery can be used as the proper measure of the angle between the legs. The exact placement and use of such an L-shaped seal in a turbine regenerator is fully described in U.S. Pat. No. 3,957,106, issued May 18, 1976 to James Whitfield. The exact location and placement of the seal does not form a part of this invention and a full discussion of the seal plate rubbing the seal placement and pertinent technology are omitted in the interest of brevity. The incorporation of the above cited patent with respect to seal placement and use is incorporated herein by reference.

Various modifications and alterations of this invention will become apparent to those skilled in the art without departing from the scope and spirit of this invention. It is to be understood that this invention is not limited to the illustrative embodiment set forth hereinabove.

What is claimed is:

1. A method of forming a flat strip of material into a curved seal of L-shaped cross section suitable for use in a gas turbine regenerator comprising the steps of:
    A. placing said strip flat against a substantially semicircular die and bending said strip to said desired curved configuration;
    B. rigidly clamping a flat longitudinal portion of said strip against said die while leaving an adjacent portion of said strip standing free;
    C. engaging a curved roller rotatably mounted adjacent a surface of said die proximate said free standing portion about an axis normal to the axis of said semicircular die with said free standing portion; and
    D. incrementally moving said roller radially and rotatively with respect to said die axis against said free standing portion to effect incremental forming of said free standing portion to make a curved concave leg portion defining an oblique angle with said clamped longitudinal portion.

2. The method of claim 1 comprising the additional step of heat treating said strip after formation.

* * * * *